United States Patent [19]

Larsson

[11] Patent Number: 4,901,983

[45] Date of Patent: Feb. 20, 1990

[54] BLAST PIPE FOR METALLURGICAL PROCESSES HAVING REFRACTORY COATED SURFACES

[75] Inventor: Arne Larsson, Stockholm, Sweden

[73] Assignee: Oxy-Tuben AB, Hofors, Sweden

[21] Appl. No.: 193,453

[22] PCT Filed: Sep. 2, 1987

[86] PCT No.: PCT/SE87/00394

§ 371 Date: Apr. 29, 1988

§ 102(e) Date: Apr. 29, 1988

[87] PCT Pub. No.: WO88/01721

PCT Pub. Date: Mar. 10, 1988

[30] Foreign Application Priority Data

Sep. 3, 1986 [SE] Sweden .................................. 8603698

[51] Int. Cl.⁴ ............................................. C21C 5/48
[52] U.S. Cl. ..................... 266/270; 106/121; 138/145; 501/101; 501/119; 501/121; 501/122
[58] Field of Search ................ 266/225, 270; 138/145, 138/146; 501/101, 119, 121, 122; 106/121

[56] References Cited

U.S. PATENT DOCUMENTS

| | | | |
|---|---|---|---|
| 2,744,021 | 5/1956 | Bargezi ............................... | 501/119 |
| 3,036,929 | 5/1962 | Kawashima et al. ............... | 138/146 |
| 3,913,625 | 10/1975 | Gazda et al. ....................... | 138/140 |
| 4,169,906 | 10/1979 | Hallstrom et al. ................. | 138/145 |
| 4,231,800 | 11/1980 | Holt et al. .......................... | 106/58 |
| 4,296,921 | 10/1981 | Hayashi .............................. | 266/270 |
| 4,397,338 | 8/1983 | Cunningham ...................... | 138/145 |
| 4,450,871 | 5/1984 | Sato et al. .......................... | 138/140 |

FOREIGN PATENT DOCUMENTS

| | | | |
|---|---|---|---|
| 11113 | 1/1979 | Japan .................................. | 501/101 |
| 2041907 | 9/1980 | United Kingdom ............... | 501/119 |

OTHER PUBLICATIONS

*Condensed Chemical Dictionary*, Eighth Edition, Van Nostrand Reinhold Co., New York, 1971, p. 533.

*Primary Examiner*—Robert McDowell
*Attorney, Agent, or Firm*—Nies, Webner, Kurz & Bergert

[57] ABSTRACT

A high-temperature resistant blast pipe is primarily intended for delivering gas, such as oxygen, and, when appropriate, solid material to metallurgical processes, and incorporates a layer of refractory material comprising a refractory mixture of solid particles and an alkali-silicate based binder.

The blast pipe is characterized in particular in that the major constituent of the binder is of the type polymerized alkali silicate.

13 Claims, No Drawings

BLAST PIPE FOR METALLURGICAL PROCESSES HAVING REFRACTORY COATED SURFACES

The present invention relates to a blast pipe which is intended for transporting gas, such as oxygen and/or solid material primarily in conjunction with metallurgical processes, and which can withstand high temperatures, said pipe comprising for this purpose at least one layer of refractory material which includes a refractory mixture of particulate solids and an alkali-silicate binder.

Blast pipes of the kind intended here are used to blow gas, such as oxygen, argon or nitrogen, or gaseous mixtures into primarily molten metal baths in conjunction with metallurgical processes, such as in the manufacture of steel in electrosteel furnaces. Applications are also found in which such pipes are used to inject a mixture of gas and solids intended for metallurgical purposes.

Blast pipes of essentially the aforesaid kind and intended for the aforesaid purpose are known to the art. One problem encountered with known blast tubes, however, is that peeling occurs due to the mechanical weakness of the layer. Furthermore, the refractory mix from which the layers are formed often requires very exclusive and expensive constituents. Known blast pipes are made of steel and the outwardly facing parts of the pipe are alloyed with aluminium by diffusion. in order to improve the high temperature properties. This alloy constitutes a very expensive part of the pipe manufacturing process.

The object of this invention is therefore to provide a blast pipe which can be produced at relatively low costs and which will also have a long useful life when used in the aforesaid context, thus satisfying the high demands placed on such blast pipes in this latter regard.

The invention thus relates to a blast pipe which is intended primarily for delivering gas, such as oxygen, and when applicable, solids to metallurgical processes, and which will resist high temperatures and which, to this end, incorporates a layer of refractory material which includes a refractory mixture of particulate solids and an alkalisilicate based binder.

The inventive blast pipe is particularly characterized in that the primary constituent of the binder is a polymerized alkali silicate.

The invention will now be described in more detail with reference to embodiments thereof.

The inventive blast pipe comprises a pipe onto which the aforesaid layer is applied. The pipe is normally made of steel, although other materials may also be used. For example, there may be used a steel pipe which has a tubular paper casing fitted externally thereon, this paper casing preferably being impregnated with a refractory substance, such as alkali silicate. The pipe may also be made predominantly of paper. Pipes which are made essentially of plastic materials, fibre glass or like materials are also conceivable.

According to one preferred embodiment the binder used in the refractory material of said layer is of the kind used in the manufacture of glues and adhesives. A particularly preferred binder is one which is sold by EKA Nobel AB under the designation "BINDZIL FK 10", or some other binder which is used in the manufacture of glues or adhesives and which has a similar composition.

"BINDZIL FK 10", in accord with product information from EKA Nobel AB, is the trade name for a Polymerized Alkali Silicate and specifically is a composition including a sodium silicate solution.

Preferably the particulate solids of the refractory mix of solid particles incorporating said refractory material comprise essentially metal oxides. In many cases it is preferred that the refractory mixture of solid particles has a composition which is similar to the composition of furnace lining material and corresponds to the kind used in metallurgical vessels intended for metallurgical processes of the kind intended here.

According to one embodiment the aforesaid mixture comprises essentially a so-called magnesite mixture, the predominant constituent of which is magnesium oxide (MgO) and the remaining constituents of which include further oxides, such as lime (CaO), quartz ($SiO_2$), iron oxide ($Fe_2O_3$) and aluminum oxide ($Al_2O_3$), preferably in the quantities of about 60-93% MgO, about 2-10% CaO, about 1-9% $SiO_2$, about 1-5% $Fe_2O_3$ and about 1-9% $Al_2O_3$.

In many cases it is preferred to incorporate a given percentage of talc in the aforesaid layer, in addition to the refractor mixture of solid particles and binder.

According to one specific embodiment of the invention, the layer is produced from a mixture of about 8-12, preferably about 10, liters of water; about 3-5, preferably ca 4, kilograms of binder in the form of "BINDZIL FK10" or the like; about 30-50, preferably about 40, kilograms of magnesite mixture; about 0.5-2, preferably about 1, kilogram of talc; and when applicable about 0.05-0.25, preferably about 0.1 kilograms of powdered carbon.

The layer is applied to the pipe, by dipping the pipe into a liquid mixture of, e.g. the kind described in the preceding paragraph, whereafter the layer of mixture thus applied is dried. The pipe is preferably kept open at both ends during the dipping process, so that a layer is applied to both the external and internal surfaces of the pipe.

The function of the inventive blast pipe will be understood in all essentials from the aforegoing. A layer produced in accordance with the invention is very tough and also resistant to high temperatures. The talc addition facilitates application of the layer forming mixture to the pipe surfaces.

It will be understood from the aforegoing that the inventive blast pipe affords considerable advantages compared with blast pipes produced in accordance wth known techniques.

The invention has been described in the aforegoing with reference to a number of preferred embodiments. It will be understood, however, that other embodiments are conceivable and that minor modifications can be made to the described embodiments without departing from the concept of the invention.

For example, refractory mixtures may be used which comprise other solid particles than those described, for example other mixtures in which the constituents are still predominantly metal oxides. It is also conceivable for the external and internal layer to be of mutually different kinds. Thus, according to one embodiment the solid particles of the refractory mix intended for an external layer may consist of a magnesite mixture of the aforesaid kind, whereas the solid particles of the refractory mix intended for an internal layer may comprise essentially bauxite.

I claim:

1. A blast pipe which is intended for delivering a material which can be a gas, or a solid, to molten metal in metallurgical processes and which is capable of withstanding high temperatures, said blast pipe having internal and external surfaces and including at least one layer of refractory material on at least one of said surfaces comprising: a refractory mixture of solid refractory particles and an alkali silicate based binder, wherein the improvement being that the major constituent of said binder is a polymerized alkali silicate.

2. A blast pipe according to claim 1 wherein the solid particles comprise metal oxides.

3. A blast pipe according to claim 1, wherein the refractory mixture comprises a mixture, the major constituent of which is MgO and the remaining constituents of which are further metal oxides, selected from the group consisting of CaO, $SiO_2$, $Fe_2O_3$ and $Al_2O_3$.

4. A blast pipe according to claim 3, wherein said refractory mixture consist essentially of about 60–93% MgO, about
2–10% CaO, about
1–9% $SiO_2$, about
1–5% $Fe_2O_3$, and about
1–9% $Al_2O_3$.

5. A blast pipe according to claim 1, wherein said layer includes talc in addition to said refractory mixture of solid particles and binder.

6. A blast pipe according to claim 1, wherein said layer is produced from a mixture of about 8–12 liters of water; about 3–5 kilograms of binder in the form of polymerized alkali silicate; about 30–50 kilograms of refractory metal oxide mixture; and about 0.5–2 kilogram of talc.

7. A blast pipe as defined in claim 6 wherein said layer is produced from a mixture which further includes about 0.05–0.2 kilogram of powdered carbon.

8. A blast pipe as defined in claim 6 wherein said layer is produced from a mixture of approximately 10 liters of water; approximately 4 kilograms of binder in the form of polymerized alkali silicate; approximately 40 kilograms of refractory metal oxide mixture; and approximately 1 kilogram of talc.

9. A blast pipe as defined in claim 8, wherein said layer is produced from a mixture which further includes approximately 0.1 kilogram of powdered carbon.

10. A blast pipe according to claim 1, wherein said basic material of the pipe is steel and said layer is applied externally to said steel pipe.

11. A blast pipe according to claim 1, wherein said basic material of pipe is a tubular paper casing fitted on a steel pipe and impregnated with a refractory; and said layer is applied externally on said tubular paper casing.

12. A blast pipe according to claim 1, wherein said layer is applied both to the external and to the internal surface of the basic pipe material.

13. A blast pipe according to claim 1 wherein said layer is applied to the internal surface of the basic pipe, and in said layer, the solid particles of the refractory mixture consist essentially of bauxite.

* * * * *

UNITED STATES PATENT AND TRADEMARK OFFICE
CERTIFICATE OF CORRECTION

PATENT NO. : 4,901,983

DATED : February 20, 1990

INVENTOR(S) : ARNE LARSSON

It is certified that error appears in the above-identified patent and that said Letters Patent is hereby corrected as shown below:

IN THE CLAIMS:

Claim 4, Column 3, line 17, change "consist" to --consists--.

Signed and Sealed this

Twenty-seventh Day of November, 1990

Attest:

HARRY F. MANBECK, JR.

*Attesting Officer*   *Commissioner of Patents and Trademarks*